United States Patent [19]

Shimizu et al.

[11] Patent Number: 5,397,849
[45] Date of Patent: Mar. 14, 1995

[54] PROCESS FOR PREVENTING POLYMER SCALE USING AN ALKALINE SOLUTION OF A CONDENSATION PRODUCT OF AN AROMATIC COMPOUND HAVING AT LEAST TWO AMINO GROUPS AND AN AROMATIC BISESTER ANHYDRIDE

[75] Inventors: Toshihide Shimizu, Urayasu; Mikio Watanabe, Ibaraki, both of Japan

[73] Assignee: Shin-Etsu Chemical Co., Ltd., Tokyo, Japan

[21] Appl. No.: 282,659

[22] Filed: Jul. 29, 1994

Related U.S. Application Data

[63] Continuation of Ser. No. 111,561, Aug. 25, 1993, abandoned.

[30] Foreign Application Priority Data

Aug. 28, 1992 [JP] Japan .................................. 4-253839

[51] Int. Cl.$^6$ .............................. C08F 2/24; C08F 2/20
[52] U.S. Cl. ...................................... 526/62; 526/200; 526/225
[58] Field of Search ................................ 526/62

[56] References Cited

U.S. PATENT DOCUMENTS

4,758,639 7/1988 Koyanagi ......................... 526/62

*Primary Examiner*—Christopher Henderson
*Attorney, Agent, or Firm*—Oblon, Spivak, McClelland, Maier & Neustadt

[57] ABSTRACT

A polymer scale preventive agent for use in polymerization of a monomer having an ethylenically unsaturated double bond, comprising an alkaline solution containing a condensation product of (A) an aromatic compound having at least two amino groups and (B) an aromatic bis-ester anhydride. This agent is used for forming a coating on the inner wall, etc. of a polymerization vessel. Such a vessel is effective in preventing polymer scale deposition and useful in producing a polymer that shows very few fish eyes and good whiteness when formed into sheets or the like.

3 Claims, No Drawings

PROCESS FOR PREVENTING POLYMER SCALE USING AN ALKALINE SOLUTION OF A CONDENSATION PRODUCT OF AN AROMATIC COMPOUND HAVING AT LEAST TWO AMINO GROUPS AND AN AROMATIC BISESTER ANHYDRIDE

This application is a continuation of application Ser. No. 08/111,561, filed on Aug. 8, 1993, now abandoned.

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

As a method of polymerizing a monomer having an ethylenically unsaturated double bond, are known suspension polymerization, emulsion polymerization, solution polymerization, gas phase polymerization and bulk polymerization. In any type of the polymerizations, polymer scale is liable to be deposited on the areas with which the monomer comes into contact during polymerization, such as inner walls, stirring equipment and so on of a polymerization vessel.

The deposition of the polymer scale results in disadvantages that the yield of the polymer and cooling capacity of the polymerization vessel are lowered; that the polymer scale may peel and mix into a polymeric product, thereby impairing the quality of formed products obtained by processing the polymeric product; and that removal of such polymer scale is laborious and hence time-consuming. Further, the polymer scale contains unreacted monomers and operators may be exposed thereto, which may cause physical disorders in the operators.

Heretofore, as a method for preventing polymer scale deposition on the inner wall and so forth, there have been known a number of methods, for example, a method in which a polar organic compound such as amine compounds, quinone compounds, aldehyde compounds, etc. is preliminarily applied to the inner wall, etc. of a polymerization vessel, as is carried out in some instances of suspension polymerization of vinyl chloride, or a method in which such compounds are added to an aqueous medium for suspension polymerization (Japanese Patent Publication (KOKOKU) No. 45-30343 (1960)).

These methods can prevent the deposition of polymer scale if polymerization run is repeated within about 5 or 6 times. However, if the number of repetition of polymerization run exceeds 5 or 6, the scale preventive effect according to the above methods is weakened. That is, the scale preventive effect is poor in durability. This disadvantage is emphasized particularly where a water-soluble catalyst is used. Thus, the polymer scale prevention according to the above-mentioned methods is unsatisfactory industrially.

It is proposed in Japanese Pre-examination Patent Publication (KOKAI) No. 53-13689 (1978) to form a coating of a condensation product of an aromatic amine compound on the areas with which monomers come into contact, such as the inner wall of a polymerization vessel. The formation of the coating of such a condensation product enables repetition of about 100 to 200 polymerization runs without deposition of polymer scale on the areas in the liquid phase, i.e., under the liquid surface inside the polymerization vessel. The effect of preventing the polymer scale deposition on the areas in the liquid phase is achieved even where a water-soluble catalyst is used.

However, the scale preventing method using a condensation product of aromatic amine compound has the drawback that polymer scale deposition is liable to occur in the vicinity of the interface between the gas phase and the liquid phase which is located at the upper section of a polymerization vessel.

Once polymer scale is deposited in the vicinity of the interface between the gas phase and the liquid phase, the deposited scale will grow gradually as polymerization runs are repeated, and at last it peels off from the inner wall, etc. to be incorporated into the polymeric product. If the polymeric product containing the polymer scale is processed into formed products such as sheets or the like, the polymer scale causes increase in fish eyes in the formed products, thereby lowering seriously the quality of the products.

Besides, where polymeric products obtained by polymerization are processed into formed products such as sheets, etc., the formed products are required to have a high whiteness. That is, when a polymeric product is formed into a sheet or the like without any addition of a coloring agent, the resulting formed product is more or less colored. Such coloration is called initial coloration, which is desired to be as low as possible. However, the coating comprising said condensation product of an aromatic amine compound disclosed in the Japanese Pre-examination Publication may be peeled or dissolved into a polymeric product, thereby lowering the whiteness, or increasing the initial coloration, of the formed products.

Furthermore, in forming a coating of the condensation product of the aromatic amine compound as described above, the condensation product is dissolved in a solvent to prepare a coating solution. The solvent is an organic solvent or a mixed solvent of water and an organic solvent, the mixed solvent being based on the organic solvent and normally containing the organic solvent in a concentration of 60% by weight or above. Therefore, there is a danger of organic-solvent inflammation, explosion or the like, together with safety problems in handling thereof, such as toxicity.

SUMMARY OF THE INVENTION

It is accordingly an object of the present invention to provide a polymer scale preventive agent for use in polymerization of a monomer having an ethylenically unsaturated double bond that can prevent effectively the deposition of polymer scale not only in the areas in the liquid phase but also in the vicinity of the interface between the gas and liquid phases, that makes it possible to produce polymeric products with a very small number of fish eyes and low initial coloration after processed into formed products such as sheets or the like, and that is substantially free from dangers of organic-solvent inflammation, explosion or the like in forming a coating comprising the agent and is free from safety problems in handling thereof, e.g., toxicity; a polymerization vessel using the same; and a process of producing a polymer using the vessel.

In order to attain the above object, the present invention provides a polymer scale preventive agent for use in polymerization of a monomer having an ethylenically unsaturated double bond, comprising an alkaline solution containing a condensation product of:
(A) an aromatic compound having at least two amino groups, and
(B) an aromatic bis-ester anhydride having the following general formula (1):

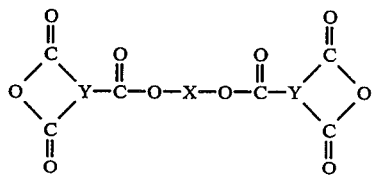

wherein X is a divalent organic group selected from the group consisting of:

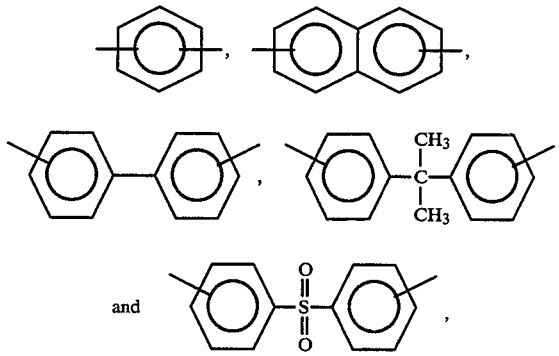

the Y groups may be the same or different and are each a trivalent organic group of the formula:

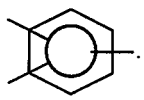

Also, the present invention provides a polymerization vessel for polymerizing a monomer having an ethylenically unsaturated double bond, comprising a coating on its inner wall surfaces,
wherein said coating has been formed by applying an alkaline solution containing a condensation product of:
(A) an aromatic compound having at least two amino groups, and
(B) an aromatic bis-ester anhydride having the above general formula (1), followed by drying.

Further, the present invention provides a process of producing a polymer of a monomer having an ethylenically unsaturated double bond, which comprises polymerizing the monomer in a polymerization vessel having a coating on its inner wall surfaces, whereby polymer scale is prevented from being deposited,
wherein said coating has been formed by applying an alkaline solution containing a condensation product of:
(A) an aromatic compound having at least two amino groups, and
(B) an aromatic bis-ester anhydride having the above general formula (1), followed by drying.

According to the present invention, deposition of polymer scale can be effectively prevented not only on the areas in the liquid phase but also in the vicinity of the interface between the gas and liquid phases in a polymerization vessel. Therefore, the present invention makes it unnecessary to conduct the operation of removing the polymer scale after every polymerization run, and the productivity is thereby improved.

Further, when the polymeric product obtained by the application of the present invention is processed into formed products such as sheets, the resulting formed products have very few fish eyes. Furthermore, the formed products obtained as above is low in initial coloration. That is, the formed products exhibit a luminosity index L in the Hunter's color difference equation described in JIS Z 8730(1980) of 70 or more in the case of vinyl chloride polymers and 80 or more in the case of SBR.

Moreover, the polymer scale preventive agents according to the present invention can be applied to inside wall surfaces of a polymerization vessel as a coating liquid to form a coating on the surfaces while using a reduced amount of organic solvent; therefore, the polymer scale preventive agents of the present invention are substantially free from dangers of organic-solvent inflammation, explosion or the like and is free from safety problems in handling thereof, e.g., toxicity.

DETAILED DESCRIPTION OF PREFERRED EMBODIMENTS

The above condensation product, which is an indispensable component of the polymer scale preventive agent according to the present invention, is a compound obtained by condensing (A) an aromatic compound having at least two amino groups with (B) an aromatic bis-ester anhydride.

The starting materials for and preparation of the condensation product will now be described below.

(A) Aromatic compound having at least two amino groups

The component (A) is an aromatic compound having at least two amino groups ($-NH_2$), which includes, for example, the compounds having one of the following general formulas (2) to (14):

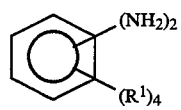

wherein the $R^1$ groups may be the same or different and are each a group selected from the group consisting of $-H$, $-NH_2$, $-Cl$, $-OH$, $-NO_2$, $-COCH_3$, $-OCH_3$, $-N(CH_3)_2$, $-COOH$, $-SO_3H$ and alkyl groups of from 1 to 3 carbon atoms;

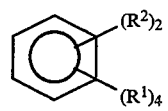

wherein the $R^1$ groups may be the same or different and each are as defined above, and the $R^2$ groups may be the same or different and are each an amino group-containing alkyl group of from 1 to 10 carbon atoms;

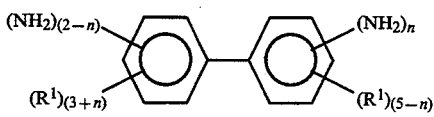 (4)

wherein the $R^1$ groups may be the same or different and each are as defined above, and n is an integer of 1 or 2;

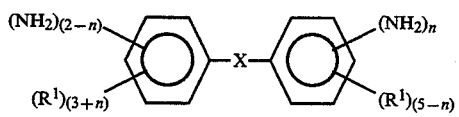 (5)

wherein the $R^1$ groups may be the same or different and each are as defined above, n is also as defined above, and X is a group selected from the group consisting of alkylene groups of from 1 to 5 carbon atoms, —CH=CH—, —N=N—, —NH—, —N(CH$_3$)—, —CONH—, —P(=O)H—, —SO$_2$—, —O—, —S—, —Si(R)$_2$— (where R is an alkyl group of from 1 to 10 carbon atoms), and the group of the formula:

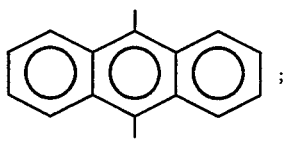 (6)

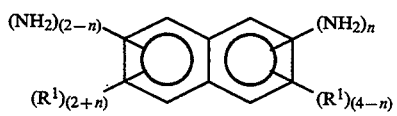

wherein the $R^1$ groups may be the same or different and each are as defined above, and n is also as defined above;

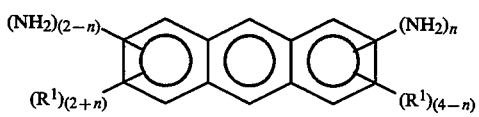 (7)

wherein the $R^1$ groups may be the same or different and each are as defined above, and n is also as defined above;

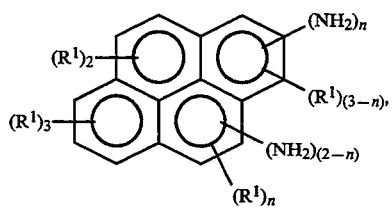 (8)

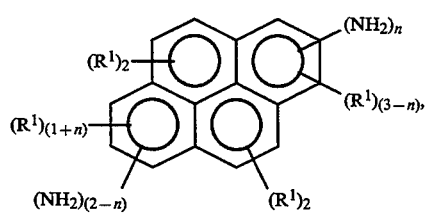 (9)

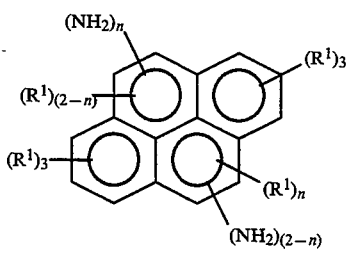 (10)

wherein in the formulas (8) to (10), the $R^1$ groups may be the same or different and each are as defined above, and n is also as defined above;

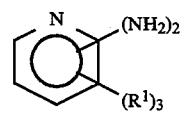 (11)

wherein the $R^1$ groups may be the same or different and each are as defined above, and n is also as defined above;

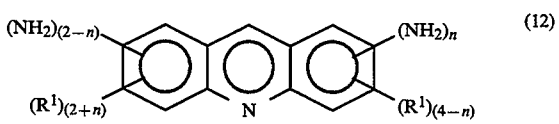 (12)

wherein the $R^1$ groups may be the same or different and each are as defined above, and n is also as defined above;

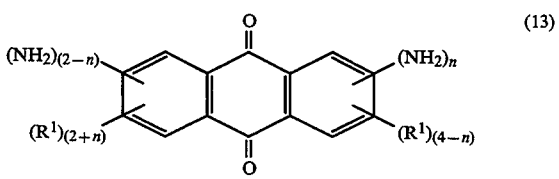 (13)

wherein the $R^1$ groups may be the same or different and each are as defined above, and n is also as defined above;

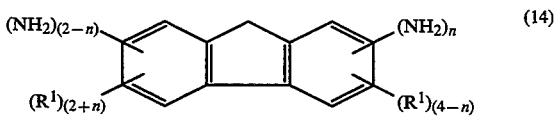 (14)

wherein the $R^1$ groups may be the same or different and each are as defined above, and n is also as defined above.

Specific examples of the compounds represented by the above general formulas (2) to (14), respectively, will be set forth below.

The compounds of the above general formula (2) include, for example, o-, m- and p-diaminobenzenes, 3,4- and 3,5-diaminobenzoic acids, 2,5-diaminobenzenesulfonic acid, 3,4-diaminochlorobenzene, 3,4-diaminophenol, 1,2-diamino-4-nitrobenzene, 2,4-diamino-1-nitrobenzene, 2,4-, 2,5- and 2,6-diaminotoluenes, 2,5- and 2,6-diamino-m-xylenes, 2,5- and 2,6-diamino-p-xylenes, and the like.

The compounds of the above general formula (3) include, for example, 2,4-bis(β-amino-t-butyl)toluene, p-bis(2-methyl-4-aminopentyl)benzene, p-bis(1,1-dimethyl-5-aminopentyl)benzene, and the like.

The compounds of the above general formula (4) include, for example, 4,4'-diamino-3,3'-biphenyldiol, 3,3'-dimethyl-4,4'-diaminobiphenyl, 3,3'-dimethoxy-4,4'-diaminoiphenyl, 4,4'-diaminobiphenyl, and the like.

The compounds of the above general formula (5) include, for example, 2,4-diaminoazobenzene, 4,4'-diaminodiphenyl ether, 4,4'-diaminodiphenylamine, 4,4'-diaminodiphenylmethane, 3,3'- and 4,4'-diaminodiphenylsulfones, 4,4'-diaminobenzanilide, 4,4'-diaminostilbene, 4,4'-diaminostilbene-2,2'-disulfonic acid, 9,10-bis(4-aminophenyl)anthracene, 4,4'-diaminodiphenyl sulfide, 4,4'-diaminodiphenylpropane, bis(4-aminophenyl)diethylsilane, bis(4-aminophenyl)phosphine oxide, bis(4-aminophenyl)-N-methylamine, and the like.

The compounds of the above general formula (6) include, for example, 1,5- and 1,8-diaminonaphthalenes, and the like.

The compounds of the above general formula (7) include, for example, 1,4- and 1,5-diaminoanthracenes, and the like.

The compounds of the above general formulas (8) to (10) include, for example, 1,6-, 1,8-, 3,5- and 5,10-diaminopyrenes, and the like.

The compounds of the above general formula (11) include, for example, 2,3-, 3,4- and 2,6-diaminopyridines, and the like.

The compounds of the above general formula (12) include, for example, 3,6-diaminoacridine and the like.

The compounds of the above general formula (13) include, for example, 1,2-, 1,4- and 2,6-diaminoanthraquinones and the like.

The compounds of the above general formula (14) include, for example, 2,3- and 2,7-diaminofluorenes and the like.

Among the above compounds applicable as the component (A), preferred are the compounds of the above general formulas (2), (4), (5), (6) and (11).

Among these compounds, particularly preferred for use as the component (A) are the compounds of the above general formulas (2), (5) and (11), among which most preferred are 4,4'-diaminobenzanilide, 4,4'-diaminodiphenylsulfone, p-diaminobenzene, 2,6-diaminopyridine, 4,4'-diaminodiphenyl ether and 4,4'-diaminodiphenylmethane.

The aromatic compounds having at least two amino groups as above may be used either singly or in combination of two or more.

(B) Aromatic bis-ester anhydride

The aromatic bis-ester anhydride (B) is a compound having the following general formula (1):

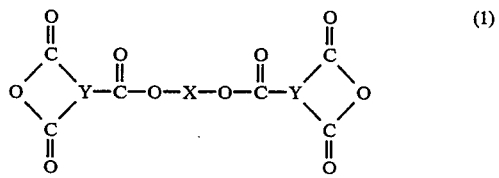

wherein X is a divalent organic group selected from the group consisting of:

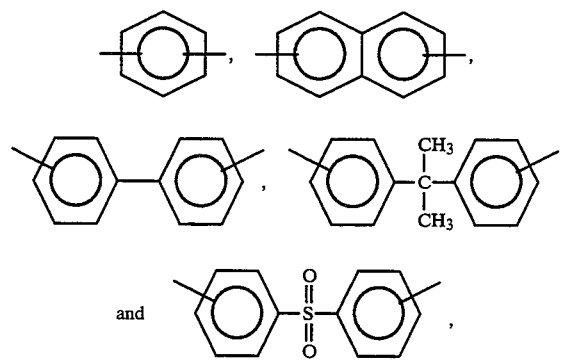

the Y groups may be the same or different and are each a trivalent organic group of the formula:

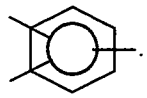

Specifically, the aromatic bis-ester anhydride (B) includes, for example,

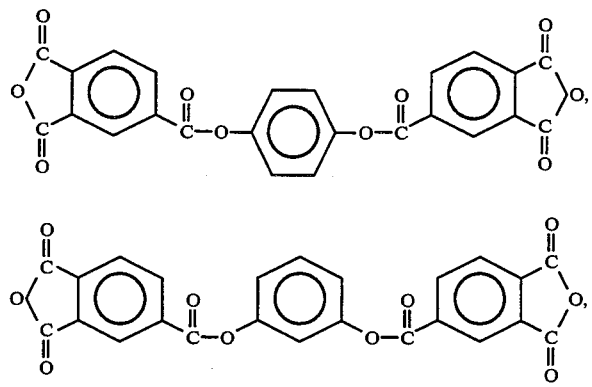

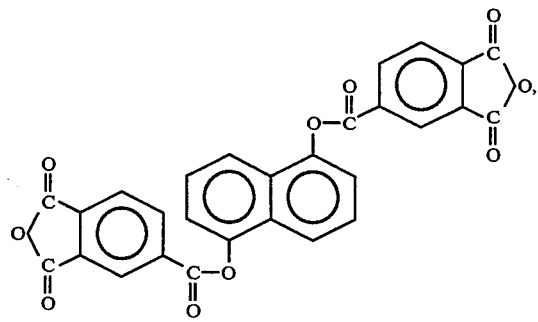
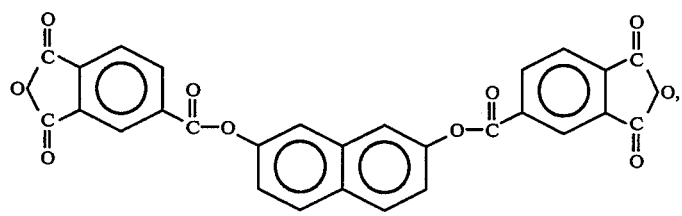
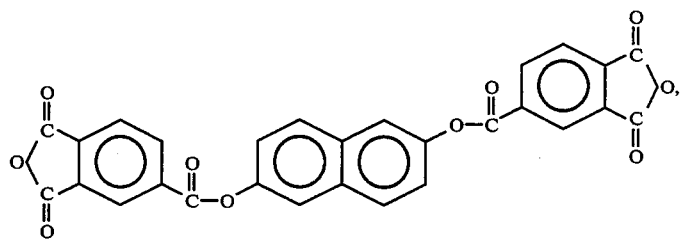
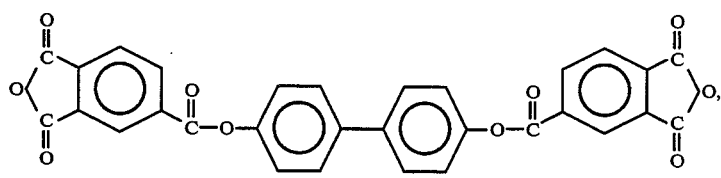
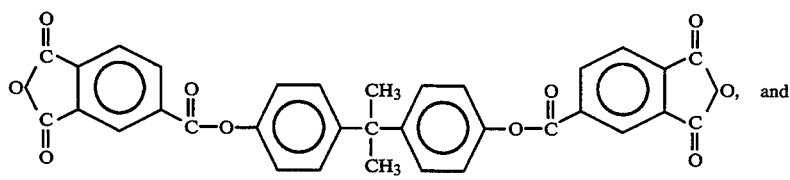
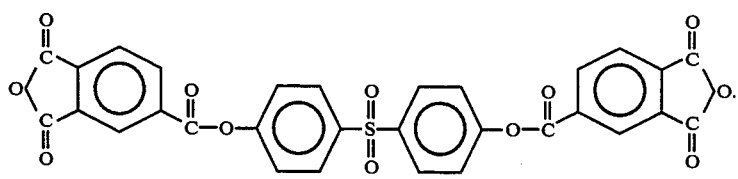
Among the aromatic bis-ester anhydrides (B) as above, preferred are the followings:
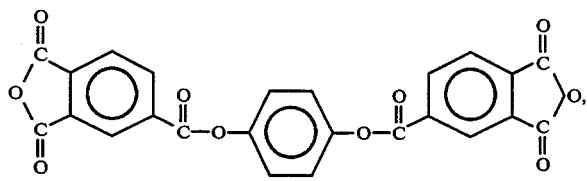

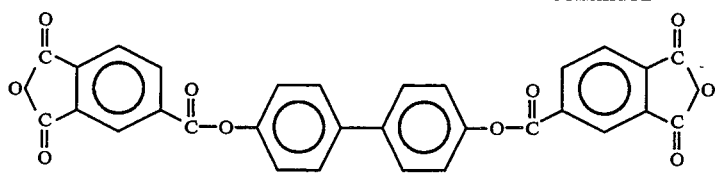

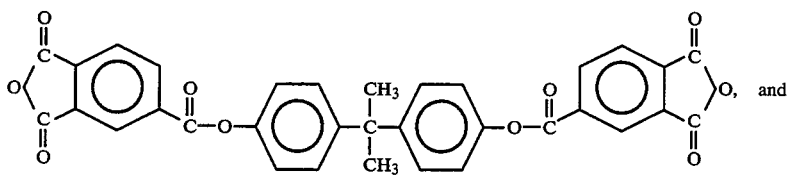

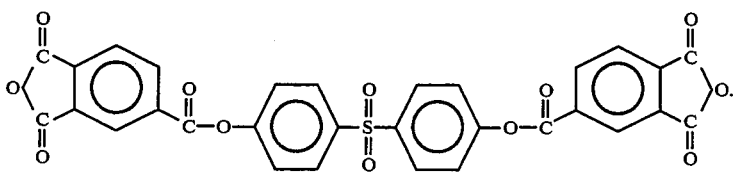

The aromatic bis-ester anhydrides as above may be used either singly or in combination of two or more.

Condensation product

The condensation product of the components (A) and (B), which is the effective constituent of the present polymer scale preventive agent, can be prepared by condensing the components (A) and (B) in a suitable organic solvent-based medium, normally at a temperature of from room temperature to about 100° C. for about 0.5 to 300 hours, preferably at a temperature of from room temperature to 50° C. for 1 to 100 hours.

As the reaction medium for the condensation reaction, organic solvents may be used. The organic solvents usable as the medium for the condensation reaction include, for example, alcohol solvents such as methanol, ethanol, propanol, butanol, 2-butanol, 2-methyl-1-propanol, 2-methyl-2-propanol, 3-methyl-1-butanol, 2-methyl-2-butanol, 2-pentanol and the like; ketone solvents such as acetone, dioxane, methyl ethyl ketone, methyl isobutyl ketone and the like; ester solvents such as methyl formate, ethyl formate, methyl acetate, methyl acetoacetate and the like; ether solvents such as 4-methyldioxolan, diethyl ether, ethylene glycol diethyl ether and the like; chlorinated hydrocarbons such as, for example, methylene chloride, chloroform, carbon tetrachloride, trichloroethylene, perchloroethylene and the like; hydrocarbon solvents such as n-heptane, n-hexane and the like; furans such as tetrahydrofuran and the like; dimethyl formamide; dimethyl acetamide; dimethyl sulfoxide; acetonitrile; N-methylpyrrolidone; m-cresol, etc. These solvents may be used singly or as a mixed solvent of two or more thereof on a case-by-case basis.

Although the amounts of the component (A) and the component (B) subjected to the condensation reaction depend on the kinds of the components (A) and (B) and of the solvent, reaction temperature, reaction time, etc., normally the component (B) is preferably used in an amount of 0.01 to 5 parts by weight, more preferably 0.05 to 2 parts by weight, per part by weight of the component (A). If the amount of the component (B) is too small or too large relative to that of the component (A), the resulting condensation product is poor in polymer scale preventing effect.

After the completion of the condensation reaction, where the resulting condensation product is settled, the condensation product may be subjected to filtration; where the resulting condensation product is dissolved in the solvent, the solution may, for example, be added dropwise to a poor solvent such as water, to settle it in the solution, followed by filtration.

Polymer scale preventive agent comprising an alkaline solution containing the condensation product of components (A) and (B)

The polymer scale preventive agent of the present invention comprises an alkaline solution of the condensation product of the components (A) and (B). The polymer scale preventive agent is used for forming a coating on, for example, the inner wall surfaces of a polymerization vessel, and the deposition of polymer scale is thereby prevented.

The polymer scale preventive agent may be prepared, for example, by mixing the above-described condensation product with an aqueous solvent and dispersing it therein, and controlling the pH of the resulting mixture to within the alkaline range.

Since the polymer scale preventive agent of the present invention is made alkaline as described above, the solubility of the condensation product of the components (A) and (B) in the aqueous solvent is increased. The polymer scale preventive agent, therefore, can be obtained as a uniform solution and, accordingly, can form a uniform coating when applied to the inner wall, etc. of a polymerization vessel. Presumably, it is due to this uniformity that an improved scale preventing effect can be obtained by use of the scale preventive agent of the present invention.

The aqueous solvents to be used for preparation of the polymer scale preventive agent include, for example, water and mixed solvents of water and an organic solvent miscible with water. The organic solvent miscible with water includes, for example, alcohols such as methanol, ethanol, propanol, etc.; ketones such as acetone, methyl ethyl ketone, etc.; esters such as methyl acetate, ethyl acetate, etc. The mixed solvents of water and an organic solvent miscible with water preferably contains the organic solvent in such an amount that there is no fear about inflammation, explosion or the like and safety in handling is ensured as to virulence, etc. Specifically, the amount of the organic solvent is preferably 50% by weight or less, and more preferably 30% by weight or less.

The pH of the polymer scale preventive agent of the present invention is in an alkaline range, preferably in the range from 7.5 to 13.5, more preferably from 9.0 to 12.5. For adjusting the pH of the polymer scale preventive agent, alkaline compounds may be used, for example, alkali metal compounds such as LiOH, NaOH, KOH, $Na_2CO_3$, $Na_2SiO_3$, $Na_2HPO_4$ and the like, ammonium compounds such as $NH_4OH$, and organic amine compounds such as ethylenediamine, propylenediamine, monoethanolamine, triethanolamine and the like.

The concentration of the condensation product of the components (A) and (B) in the alkaline solution is not limited as long as a total coating weight described later can be obtained. Normally, the concentration is in the range of about 0.005 to about 10% by weight, preferably 0.01 to 5% by weight.

To the polymer scale preventive agent described above, a cationic, nonionic or anionic surface active agent and the like can be added, as long as the polymer scale preventing effect is not impaired. Further, a water-soluble polymeric compound such as cationic polymeric compounds, anionic polymeric compounds and amphoteric polymeric compounds can be optionally added.

The cationic polymeric compound includes cationic polymeric electrolytes containing a nitrogen atom with positive charge in the side chain, including, for example, polyvinylamines, polyethyleneamines, polyethyleneimines, polyacrylamides, N-vinyl-2-pyrrolidone/acrylamide copolymer, cyclic polymers of dimethyldiamylammonium chloride, cyclic polymers of dimethyldiethylammonium bromide, cyclic polymers of diallylamine hydrochloride, cyclic polymers of dimethyldiallylammonium chloride and sulfur dioxide, polyvinylpyridines, polyvinylpyrrolidones, polyvinylcarbazoles, polyvinylimidazolines, polydimethylaminoethyl acrylates, polydimethylaminoethyl methacrylates, polydiethylaminoethyl acrylate, and polydiethylaminoethyl methacrylate.

The anionic polymeric compound includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid and polystyrenesulfonic acid, and alkali metal salts or ammonium salts of these, and carboxymethyl cellulose.

The amphoteric polymeric compounds include, for example, glue, gelatin, casein, and albumin.

Furthermore, if necessary, inorganic compounds can also be added to the polymer scale preventive agent of the present invention as desired, provided the scale preventing effect is not thereby impaired. The inorganic compounds which can be added include, for example, silicic acids or silicates such as orthosilicic acid, metasilicic acid, mesodisilicic acid, mesotrisilicic acid, mesotetrasilicic acid, sodium metasilicate, water glass, etc.; metallic salts such as oxyacid salts, acetates, nitrate, hydroxides or halides of metal selected from alkaline earth metals such as magnesium, calcium and barium, zinc family group metals such as zinc, aluminum family metals such as aluminum, and platinum family metals such as platinum; inorganic colloids such as ferric hydroxide colloid, silicic acid colloid, barium sulfate colloid, aluminum hydroxide colloid, and the like. The inorganic colloids may be prepared, for example, by mechanical grinding, irradiation with ultrasonic wave, electrical dispersing techniques or chemical techniques.

Formation of the Coating

The polymer scale preventive agent is applied to the inner walls of a polymerization vessel and then dried sufficiently at a temperature from room temperature to 100° C., for instance, followed by washing with water if necessary, to form the coating.

The polymer scale preventive agent is preferably applied to not only the inner wall surfaces of a polymerization vessel but also other areas with which the monomer comes into contact during polymerization to form the coating on such areas. For example, on an stirring shaft, stirring blades, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, areas with which unreacted monomer comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the scale preventing agent to the inner wall surfaces of a polymerization vessel, etc. is not particularly restricted, and includes, for example, the brush coating, spray coating, the method by filling the polymerization vessel with the scale preventive agent followed by withdrawal thereof, and automatic coating methods as disclosed in Japanese Pre-examination Patent Publication (KOKAI) Nos. 57-61001 (1982) and 55-36288 (1980), and Japanese Patent Publication (KOHYO) Nos. 56-501116 (1981) and 56-501117 (1981), and Japanese Pre-examination Publication (KOKAI) No. 59-11303 (1984), etc.

The method of drying wet coated surfaces provided by application of the polymer scale preventive agent, is not restricted, either. Following methods can be used. That is, a method in which, after the agent is applied, hot air with an suitable elevated temperature is blown to the coated surface, and a method in which the inner wall surface of a polymerization vessel and the surfaces of other parts to be coated are previously heated to 30° to 80° C., and the polymer scale preventive agent is directly applied to the heated inner wall surfaces, etc. After dried, the coated surfaces are washed with water if necessary.

The coating thus obtained has a coating weight of normally 0.001 $g/m^2$ to 5 $g/m^2$, and preferably from 0.05 to 2 $g/m^2$.

The formed coating has good durability and retains the scale-preventing action; therefore, it is unnecessary for the above-described coating operation to be carried out every batch of polymerization. Hence, productivity is improved.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which this invention can be applied may include, for example, vinyl halides such as vinyl chloride; vinyl esters such as vinyl acetate and vinyl propionate; acrylic acid, methacrylic acid and their esters and salts; maleic acid, fumaric acid and their esters and anhydrides; diene monomers such as butadiene, chloroprene and isoprene; styrene; α-methylstyrene; acrylonitrile; vinylidene halides such as vinylidene chloride; and vinyl ethers.

There are no particular limitations on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to suspension or emulsion polymerization in an aqueous medium.

In the following, general conditions are described on each type of polymerizations.

In suspension or emulsion polymerization, first, water and a dispersing agent are charged into a polymerization vessel, and thereafter a polymerization initiator is charged. Subsequently, the inside of the polymerization vessel is evacuated to a pressure of 0.1 to 760 mmHg, and a monomer is then charged (whereupon the pressure inside the polymerization vessel usually becomes from 0.5 to 30 kgf/cm$^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, polymerization of vinyl chloride is carried out at 30° to 80° C., and polymerization of styrene is carried out at 50° to 150° C. The polymerization may be judged to be completed when the pressure inside the polymerization vessel has fallen to from 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In solution polymerization, an organic solvent such as toluene, xylene and pyridine is used as the polymerization medium in place of water. The dispersing agent is optionally used. The other conditions are generally the same as those described for suspension and emulsion polymerizations.

In bulk polymerization, after a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. For example, the reaction temperature is 30° to 80° C. for polymerization of vinyl chloride, and is 50° to 150° C. for styrene.

The present invention makes it possible to prevent polymer scale from being deposited, independent of materials constituting the inner wall, etc. of a polymerization vessel. For example, this invention can prevent deposition of polymer scale even where polymerization is carried out in a polymerization vessel made of a steel including stainless steel or lined with glass.

Any additive materials that have been conventionally added in a polymerization system can be used without any limitation. More specifically, the prevention of polymer scale deposition according to the present invention can be effectively achieved even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspending agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

The polymer scale preventive agent of the present invention may be added to a polymerization mass in addition to the formation of the coating, so that the scale preventing effect is further improved. The amount of the polymer scale preventive agent to be added to the polymerization mass preferably ranges from about 10 to about 1,000 ppm based on the whole weight of the monomers charged. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other experiments are working examples of the present invention.

PRODUCTION EXAMPLE 1

Production of Condensation Product No. 1

0.3 mol of 4,4'-diaminodiphenylmethane was dissolved in dimethylformamide with stirring at room temperature. Similarly, 0.3 mol of an aromatic bis-ester anhydride shown in Table 1 was dissolved in dimethylformamide with stirring at room temperature.

The two dimethylformamide solutions obtained as above were charged into a 3-liter autoclave and mixed. The resulting mixture was brought to reaction at room temperature (20° to 30° C.) for 40 hours. After the completion of the reaction, a condensation product that settled was filtered off and then dried in vacuum at room temperature. The condensation product thus obtained is referred to as Condensation Product No. 1

Production of Condensation Product Nos. 2 to 14

In each production, the procedure of production for Condensation Product No. 1 described above was repeated, except for using an (A) component (aromatic compound having at least two amino groups) and a (B) component (aromatic bis-ester anhydride) as given in Table 1 and a solvent as given in Table 2, to produce a condensation product.

In Table 2, total concentration (% by weight) of components (A) and (B), (A):(B) weight ratio, reaction temperature and reaction time in each production are given. Thus, Condensation Product Nos. 2 to 14 were obtained.

TABLE 1

| Condensation product No. | (A) Aromatic compound having at least two amine groups | (B) Aromatic bisester anhydride |
|---|---|---|
| 1 | 4,4'-Diaminodiphenylmethane | X: 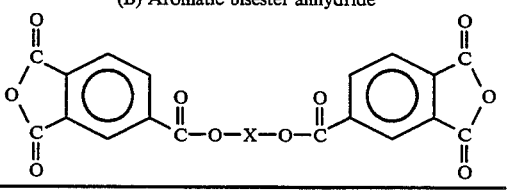 |
| 2* | — | X: 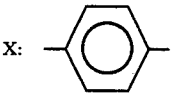 |
| 3* | 4,4'-Diaminodiphenylmethane | — |
| 4 | 4,4'-Diaminobenzanilide | X: 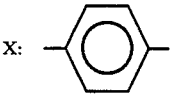 |
| 5 | 4,4'-Diaminodiphenylsulfone | X: 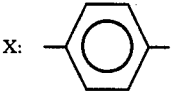 |
| 6 | 4,4'-Diaminodiphenyl ether | X: 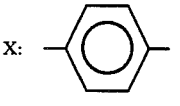 |
| 7 | 2,6-Diaminopyridine | X: 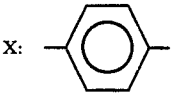 |
| 8 | p-Diaminobenzene | X: 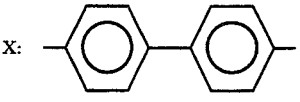 |
| 9 | 4,4'-Diaminodiphenylmethane | X: 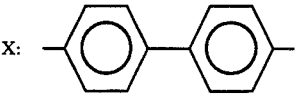 |
| 10 | p-Diaminobenzene | X: 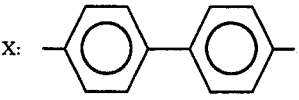—$SO_2$—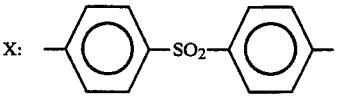 |

TABLE 1-continued (B) Aromatic bisester anhydride

[Structure: aromatic bisester anhydride with formula showing two phthalic anhydride groups connected through -C(=O)-O-X-O-C(=O)- linker]

| Condensation product No. | (A) Aromatic compound having at least two amine groups | X |
|---|---|---|
| 11 | 4,4'-Diaminobenzanilide | —⟨phenyl⟩—$SO_2$—⟨phenyl⟩— |
| 12 | 2,6-Diaminopyridine | —⟨phenyl⟩—$SO_2$—⟨phenyl⟩— |
| 13 | p-Diaminobenzene | —⟨phenyl⟩—$C(CH_3)_2$—⟨phenyl⟩— |
| 14 | 4,4'-Diaminobenzanilide | —⟨phenyl⟩—$C(CH_3)_2$—⟨phenyl⟩— |

TABLE 2

| Condensation product No. | Total concentration of (A) + (B) (wt. %) | (A):(B) (weight ratio) | Solvent | Reaction temp. (°C.) | Reaction time (Hr) |
|---|---|---|---|---|---|
| 1 | 0.6 | 1:1 | Dimethylformamide | R.T. | 40 |
| 2* | 0.3 | — | Dimethylformamide | R.T. | 40 |
| 3* | 0.3 | — | Dimethylformamide | R.T. | 40 |
| 4 | 0.2 | 1:1 | Dimethyl sulfoxide | R.T. | 40 |
| 5 | 0.2 | 1:1.5 | Acetonitrile | R.T. | 40 |
| 6 | 0.2 | 1:0.5 | Dimethylacetamide | R.T. | 40 |
| 7 | 0.3 | 1:1 | Dimethyl sulfoxide | R.T. | 40 |
| 8 | 0.4 | 1:1 | m-Cresol | R.T. | 40 |
| 9 | 0.5 | 1:0.8 | N-Methylpyrrolidone | R.T. | 40 |
| 10 | 0.2 | 1:1 | Dimethylformamide | 40° C. | 80 |
| 11 | 0.2 | 1:1 | Dimethylformamide | 40° C. | 80 |
| 12 | 0.2 | 1:1 | Dimethylformamide | 40° C. | 80 |
| 13 | 0.2 | 1:1 | Dimethylformamide | 40° C. | 80 |
| 14 | 0.2 | 1:1 | Dimethylformamide | 40° C. | 80 |

EXAMPLE 1

(Experiment Nos. 101 to 115)

In each experiment, polymerization was conducted using a stainless steel polymerization vessel with an inner capacity of 1,000 liters and having an agitator, as described below.

First, a polymer scale preventive agent as shown in Table 3 (concentration of condensation product, solvent composition, and pH) was prepared using a condensation product, a solvent and an alkaline compound given in Table 3. The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, and the inside of the vessel was then washed with water.

Thereafter, in each experiment, polymerization was carried out as follows. The polymerization vessel in which the coating was formed as above was charged with 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide, followed by polymerization with stirring at 66° C. for 6 hours. After the completion of the polymerization, the produced polymer was taken out and unreacted monomer was recovered out of the polymerization vessel. Subsequently, the inside of the polymerization vessel was washed with water and residual resin was removed.

A batch of operations of charging the materials into the polymerization vessel through polymerization to washing with water as described above (excluding the operation of forming the coating) was repeated. The number of repetition of the batch for each experiment is given in Table 4.

After the final batch, in each experiment, the amount of polymer scale deposited on an area located in the liquid phase during polymerization and on an area in the vicinity of the interface between the gas and liquid phases, was measured according to the method below.

Measurement of the amount of polymer scale

The scale deposited in an area of 10 cm square on the inner wall is scraped off with a stainless steel spatula as completely as possible to be confirmed with naked eyes, in accordance with JIS Z 8722. As the geometric condition for illumination and being illuminated, the condition d defined in section 4.3.1 of JIS Z 8722 is adopted. Next, L is calculated based on the equation: $L=10Y^{\frac{1}{2}}$ described in JIS Z 8730 (1980).

The results of the above measurements are set forth in Table 4.

TABLE 3

| | | | Polymer scale preventive agent | | | |
|---|---|---|---|---|---|---|
| Exp. No. | Condensation product No. | Concentration (wt. %) | Alkaline compound | pH | Solvent | (weight ratio) |
| 101 | 1 | 0.3 | Ethylenediamine | 11.5 | Water:Methanol | (90:10) |
| 102* | 2 | 0.3 | Ethylenediamine | 11.5 | Water:Methanol | (90:10) |
| 103* | 3 | 0.3 | Ethylenediamine | 11.5 | Water:Methanol | (90:10) |
| 104 | 4 | 0.3 | Ethylenediamine | 11.5 | Water | |
| 105 | 5 | 0.2 | Ethylenediamine | 11.0 | Water | |
| 106 | 6 | 0.3 | Ethylenediamine | 11.0 | Water | |
| 107 | 7 | 0.3 | Ethylenediamine | 10.0 | Water | |
| 108 | 8 | 0.3 | Ethylenediamine | 2.0 | Water:Methanol | (90:10) |
| 109 | 9 | 0.2 | Ethylenediamine | 11.0 | Water:Methanol | (90:10) |
| 110 | 10 | 0.1 | NaOH | 10.0 | Water:Methanol | (90:10) |
| 111 | 11 | 0.05 | NaOH | 11.5 | Water:Methanol | (90:10) |
| 112 | 12 | 0.2 | NaOH | 11.5 | Water:Ethanol | (95:5) |
| 113 | 13 | 0.2 | Monoethanolamine | 11.5 | Water:Propanol | (95:5) |
| 114 | 14 | 0.2 | Triethanolamine | 11.5 | Water:Isopropanol | (95:5) |
| 115* | 1 | 0.2 | — | 5.5 | Water:Methanol | (90:10) | and then the scraped scale is weighed on a balance. Thereafter, the amount of the deposited scale per area of 1 m² is obtained by multiplying the measured value by 100.

The number of fish eyes which may appear when a polymer is formed into sheet was measured with respect to the polymers produced in the experiments according to the method below.

Measurement of Fish Eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 cm² by light transmission.

Further, to evaluate initial coloration at the time a polymer is formed into sheet, luminosity index L was measured according to the method below.

Measurement of Luminosity Index L

A hundred parts by weight of a polymer, 1 part by weight of a tin laurate stabilizing agent (trade name: TS-101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a mold measuring 4 cm×4 cm×1.5 cm (depth), and molded under heating at 160° C. and a pressure of 65 to 70 kgf/cm² for 0.2 hours to prepare a test specimen. This test specimen is measured for luminosity index L in the Hunter's color difference equation described in JIS Z 8730 (1980). The more the value of L, the lower the initial coloration.

The value of L was determined as follows.

The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.)

TABLE 4

| Exp. No. | Number of repeated batches (batch) | Polymer scale amount (g/m²) | | Number of fish eyes | L value |
|---|---|---|---|---|---|
| | | Liquid phase | Around interface of gas and liquid phases | | |
| 101 | 3 | 0 | 6 | 4 | 73.0 |
| 102* | 2 | 30 | 900 | 45 | 73.0 |
| 103* | 2 | 30 | 900 | 45 | 73.0 |
| 104 | 3 | 0 | 8 | 6 | 73.0 |
| 105 | 3 | 0 | 8 | 6 | 73.0 |
| 106 | 3 | 0 | 8 | 6 | 73.0 |
| 107 | 3 | 0 | 7 | 6 | 73.0 |
| 108 | 3 | 0 | 6 | 4 | 73.0 |
| 109 | 3 | 0 | 6 | 4 | 73.0 |
| 110 | 2 | 0 | 22 | 14 | 72.5 |
| 111 | 2 | 0 | 20 | 16 | 72.5 |
| 112 | 2 | 0 | 21 | 12 | 72.5 |
| 113 | 2 | 0 | 15 | 10 | 73.0 |
| 114 | 2 | 0 | 13 | 11 | 73.0 |
| 115* | 2 | 30 | 900 | 45 | 73.0 |

EXAMPLE 2

(Experiment Nos. 201 to 210)

In each experiment, polymerization was conducted using a stainless steel polymerization vessel with an inner capacity of 20 liters and having an agitator, as described below.

First, a polymer scale preventive agent as shown in Table 5 (concentration of condensation product, solvent composition, and pH) was prepared using a condensation product, a solvent and an alkaline compound given in Table 5. The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

Thereafter, in each experiment, polymerization was carried out as follows. The polymerization vessel in which the coating was formed as above was charged with 9 kg of water, 225 g of sodium dodecylbenzenesulfonate, 12 g of t-dodecyl mercaptan and 13 g of potassium peroxodisulfate. After the inside of the polymerization vessel was replaced with a nitrogen gas, 1.3 kg of styrene and 3.8 kg of butadiene were charged, followed by polymerization at 50° C. for 20 hours. After the completion of the polymerization, the produced polymer was taken out and unreacted monomer was recovered out of the polymerization vessel. Subsequently, the inside of the polymerization vessel was washed with water and residual resin was removed.

A batch of operations of charging the materials into the polymerization vessel through polymerization to washing with water as described above (excluding the operation of forming the coating) was repeated. The number of repetition of the batch for each experiment is given in Table 6.

After the final batch, in each experiment, the amount of polymer scale deposited on an area located in the liquid phase during polymerization and on an area in the vicinity of the interface between the gas and liquid phases, was measured in the same manner as in Example 1.

Further, to evaluate initial coloration at the time a polymer is formed into sheet, luminosity index L was measured according to the method below.

Measurement of Luminosity Index L

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm² for 0.2 hours and press molded under the final pressure of 80 kgf/cm² to prepare a test specimen.

This test specimen was measured for luminosity index L in the same manner as above described.

The results of the above measurements are set forth in Table 6.

TABLE 5

| Exp. No. | Polymer scale preventive agent | | | | |
|---|---|---|---|---|---|
| | Condensation product No. | Concentration (wt. %) | Alkaline compound | pH | Solvent (weight ratio) |
| 201 | 1 | 0.3 | Ethylenediamine | 11.5 | Water:Methanol (90:10) |
| 202* | 2 | 0.3 | Ethylenediamine | 11.5 | Water:Methanol (90:10) |
| 203* | 3 | 0.3 | Ethylenediamine | 11.5 | Water:Methanol (90:10) |
| 204 | 6 | 0.3 | NaOH | 11.5 | Water:Methanol (90:10) |
| 205 | 7 | 0.2 | Monoethanolamine | 11.5 | Water:Methanol (90:10) |
| 206 | 8 | 0.2 | Triethanolamine | 10.5 | Water |
| 207 | 12 | 0.2 | Ethylenediamine | 11.0 | Water:Ethanol (95:5) |
| 208 | 13 | 0.2 | Ethylenediamine | 11.0 | Water:Propanol (95:5) |
| 209 | 14 | 0.2 | Propylenediamine | 11.0 | Water:Isopropanol (95:5) |
| 210* | 1 | 0.3 | — | 5.5 | Water:Methanol (90:10) |

TABLE 6

| Exp. No. | Number of repeated batches (batch) | Results of polymerization | | L value |
|---|---|---|---|---|
| | | Polymer scale amount (g/m²) | | |
| | | Liquid phase | Around interface of gas and liquid phases | |
| 201 | 3 | 2 | 8 | 85.0 |
| 202* | 2 | 35 | 370 | 85.0 |
| 203* | 2 | 30 | 340 | 85.0 |
| 204 | 3 | 13 | 23 | 84.5 |
| 205 | 3 | 10 | 21 | 85.0 |
| 206 | 3 | 11 | 18 | 85.0 |
| 207 | 3 | 3 | 7 | 85.0 |
| 208 | 3 | 3 | 7 | 85.0 |
| 209 | 3 | 2 | 5 | 85.0 |
| 210* | 2 | 30 | 360 | 85.0 |

We claim:

1. A process of producing a polymer of a monomer having an ethylenically unsaturated double bond, which comprises polymerizing the monomer in a polymerization vessel having a polymer scale preventive coating on its inner wall surfaces, whereby polymer scale is prevented from being deposited, wherein said polymer scale preventive coating has been formed by applying, as polymer scale preventive agent, an alkaline solution with a pH of 7.5 to 13.5, consisting essentially of a condensation product of:

(A) an aromatic compound having at least two amino groups and having one of the following formulas (2) to (14):

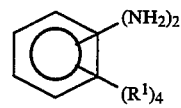
(2)

wherein the $R^1$ groups may be the same or different and are each a member selected from the group consisting of —H, —NH$_2$, —Cl, —OH, —NO$_2$, —COCH$_3$, —OCH$_3$, —N(CH$_3$)$_2$, —COOH, —SO$_3$H and alkyl groups of from 1 to 3 carbon atoms;

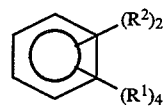
(3)

wherein the $R^1$ groups may be the same or different and each are as defined above, and the $R^2$ groups may be the same or different and are each an amino group-containing alkyl group of from 1 to 10 carbon atoms;

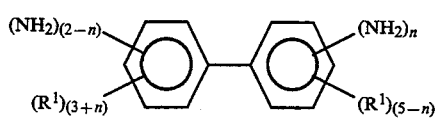

(4)

wherein the $R^1$ groups may be the same or different and each are as defined above, and n is an integer of 1 or 2;

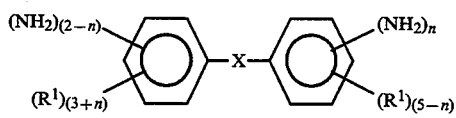

(5)

wherein the $R^1$ groups may be the same or different and each are as defined above, n is also as defined above, and X is a member selected from the group consisting of alkylene groups of from 1 to 5 carbon atoms, —CH=CH—, —N=N—, —NH—, —N(CH$_3$)—, —CONH—, —P(=O)H—, —SO$_2$—, —O—, —S—, —Si(R)$_2$— (where R is an alkyl group of from 1 to 10 carbon atoms), and the group of the formula:

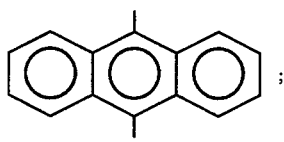

(6)

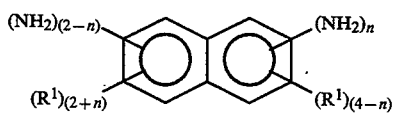

wherein the $R^1$ groups may be the same or different and each are as defined above, and n is also as defined above;

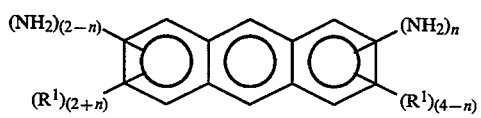

(7)

wherein the $R^1$ groups may be the same or different and each are as defined above, and n is also as defined above;

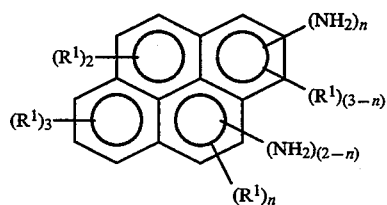

(8)

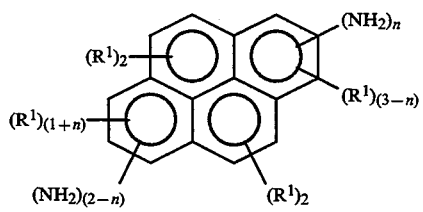

(9)

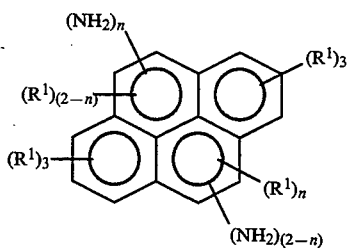

(10)

wherein in the formulas (8) to (10), the $R^1$ groups may be the same or different and each are as defined above, and n is also as defined above;

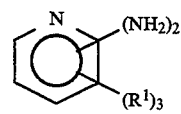

(11)

wherein the $R^1$ groups may be the same or different and each are as defined above, and n is also as defined above;

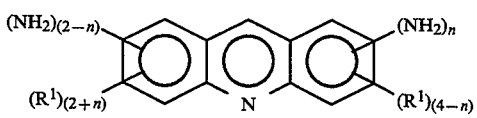

(12)

wherein the $R^1$ groups may be the same or different and each are as defined above, and n is also as defined above;

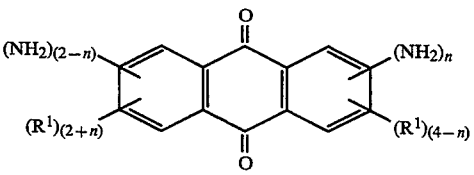

(13)

wherein the $R^1$ groups may be the same or different and each are as defined above, and n is also as defined above;

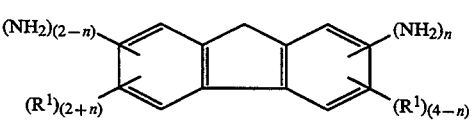

(14)

wherein the $R^1$ groups may be the same or different and each are as defined above, and n is also as defined above, and (B) an aromatic bis-ester anhydride having the following formula (1):

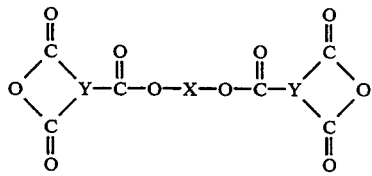

(1)

wherein X is a divalent organic group selected from the groups consisting of:

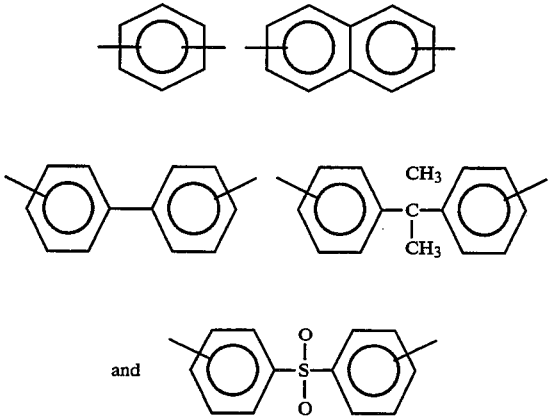

and Y groups may be the same or different and are each a trivalent organic group of the formula:

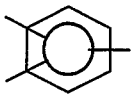

in a solvent of water or a mixed solvent of water and an organic solvent miscible with water, wherein said organic solvent is contained in an amount of 50% by weight or less; said condensation product having been produced by condensing said components (A) and (B) in an organic solvent-based medium at a temperature of from room temperature to about 100° C., followed by drying at a temperature of from room temperature to 100° C.

2. The process of claim 1, wherein said polymerization is conducted as suspension polymerization, emulsion polymerization, solution polymerization, bulk polymerization or gas phase polymerization.

3. The process of claim 1, wherein said monomer is selected from the group consisting of vinyl esters; vinyl halides; vinylidene halides; acrylic acid, methacrylic acid and their esters and salts; maleic acid, fumaric acid and their esters and anhydrides; diene monomers; styrene; acrylonitrile; α-methylstyrene; and vinyl ethers.

* * * * *